United States Patent [19]

Takahashi et al.

[11] 4,305,648

[45] Dec. 15, 1981

[54] ELECTRIC CIRCUITS FOR USE IN CAMERA

[75] Inventors: Akira Takahashi, Kawasaki; Shinichiro Koshiishi, Hino, both of Japan

[73] Assignee: Ricoh Company, Ltd., Japan

[21] Appl. No.: 6,225

[22] Filed: Jan. 24, 1979

[30] Foreign Application Priority Data

Jan. 25, 1978 [JP] Japan .................................. 53-7554
Jan. 25, 1978 [JP] Japan .................................. 53-7555
Jan. 25, 1978 [JP] Japan .................................. 53-7556
Feb. 10, 1978 [JP] Japan ............................. 53-15380[U]
Mar. 28, 1978 [JP] Japan ................................. 53-35665

[51] Int. Cl.³ ........................ G03B 7/083; G03B 17/18
[52] U.S. Cl. ............................... 354/51; 354/60 L
[58] Field of Search ............. 354/53, 60 E, 60 L, 354/51, 29, 30, 36, 38

[56] References Cited

U.S. PATENT DOCUMENTS

3,429,242  2/1969  Yoshida et al. .................. 354/51
3,721,166  3/1973  Yanagi et al. ..................... 354/51
3,738,237  6/1973  Uchiyama et al. .............. 354/60 L Primary Examiner—George H. Miller, Jr.
Assistant Examiner—William B. Perkey
Attorney, Agent, or Firm—McGlew and Tuttle

[57] ABSTRACT

The electric circuit for use with a camera is capable of controlling exposure and alarming camera vibrations and obviating wrong display of a camera vibration alarm means and improper operation of a shutter of the camera.

14 Claims, 32 Drawing Figures

ELECTRIC CIRCUITS FOR USE IN CAMERA

BACKGROUND OF THE INVENTION

The present invention relates to an electric circuit for a camera for controlling exposure and alarming vibrations of the camera.

Figure 1:
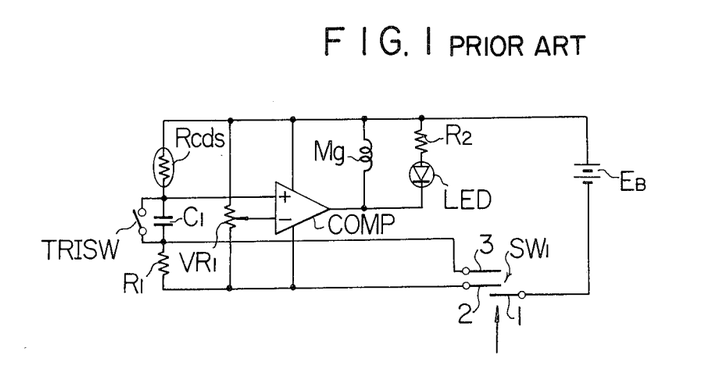
FIG. 1 is a diagram of a circuit of a conventional camera.

Conventionally, an electric circuit for a camera for controlling exposure and alarming vibrations of the camera as shown in FIG. 1 is known. The electric circuit is set in its "vibration alarm mode" when a release button is depressed so lightly and that only contacts 1 and 2 of a switch SW1 are connected together and a power source $E_B$ is connected through these contacts to this electric circuit. In other worlds, with a trigger switch TRISW closed, the power supply voltage is divided by a series circuit comprising a light receiving element Rcds for exposure photometry and a resistor R1. That part of the voltage across the resistor R1 is applied to one input terminal of a comparator COMP to be compared with a reference voltage Vref, which is set by a variable resistor VR1 and is applied to the other input terminal of the comparator. The output of the comparator COMP is applied through the resistor R2 to a light emitting diode LED for warning the photographer when there is not enough light for taking a photograph. The output of the comparator COMP is low only when the voltage at the lower end of the light receiving element Rcds is lower than the reference voltage Vref at the arm of the variable resistor, or potentiometer, VR1. The electromagnet, or magnet, Mg and the light emitting diode LED are energized only when the output of the comparator COMP is low. Therefore, the light emitting diode should be energized only when there is not enough illumination on the scene to permit a photograph to be taken. The light emitting diode LED should be "off" when there is adequate scene illumination.

When the release button is depressed farther, all three of the contacts 1, 2, and 3 of the switch SW1 are connected together. This places the electric circuit in its "timer mode". Bringing the contacts 2 and 3 of the switch SW1 together short-circuits the resistor R1 so that an ordinary timer circuit is formed in which the resistive element is the light emitting element Rcds and the condenser is the condenser C1. The timing operation starts when the switch TRISW is opened, but as long as it is closed, and with the resistor R1 short-circuited, the voltage at the bottom of the light receiving element Rcds is substantially at the voltage of the negative terminal of the power supply $E_B$. This is below the level of the reference voltage Vref, and so the output of the comparator COMP is low, which not only energizes the magnet Mg, but also causes the light emitting diode LED to be turned on, irrespective of the ambient light. As a result, as long as the circuit remains in this condition, the light emitting diode may well yield an incorrect indication of the available light on the scene which the photographer desires to photograph.

When the shutter is mechanically released, as by further actuation of the release button, the shutter blades open. Simultaneously, the trigger switch TRISW also opens. This causes the voltage oo begin to be integrated by the light receiving element Rcds and the condenser C1, which operates as an integrating condenser. When the integrated voltage at the common connection point between the condenser C1 and the light receiving element Rcds builds up sufficiently to be equal to the reference voltage Vref, the output of the comparator COMP changes from low to high, and current flow through the magnet Mg and through the light emitting diode LED is turned off and the shutter blades are closed, thus ending the exposure at a time determined by the timing circuit.

Figure 2:
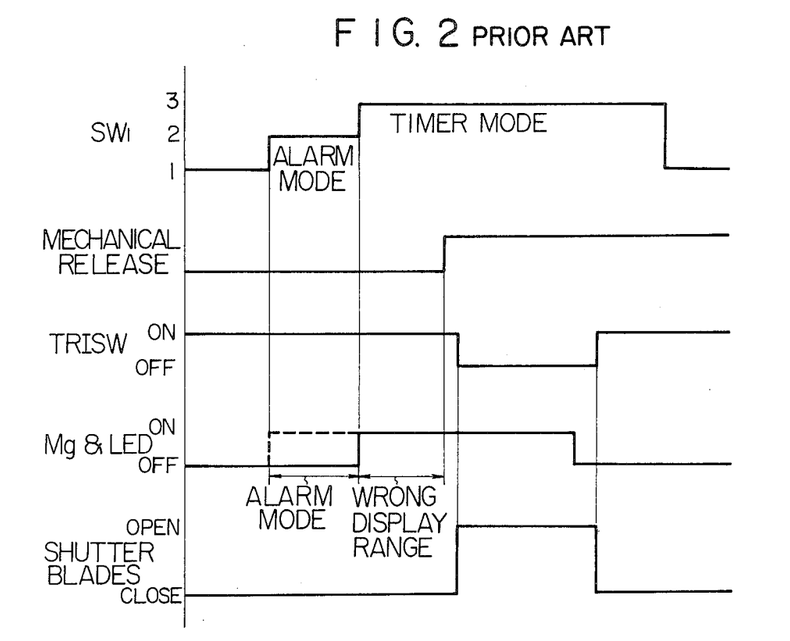
FIG. 2 is a timing diagram of the circuit of FIG. 1.

FIG. 2 shows a timing diagram of the above-mentioned operation. As can be seen from FIG. 2, when the construction of the release button that actuates the switch SW1 and the shutter is such that it can be stopped easily within the range in which the above-mentioned wrong display of the light emitting diode LED can be made, the light emitting diode LED may be lighted, irrespective of the surrounding lightness when the release button is stopped in the range. Therefore, it is preferable that the stroke of that release button in the range be as small as possible. However, when the release mechanism is of a sensor type, the whole stroke may be, for example, as small as 1.5 mm, although the normal stroke is in the range of 6 to 8 mm. In such case, it is difficult to adjust the above-mentioned stroke to be sufficiently small. Consequently, it is impossible to completely prevent the light emitting diode LED from being operated incorrectly.

Figure 3:
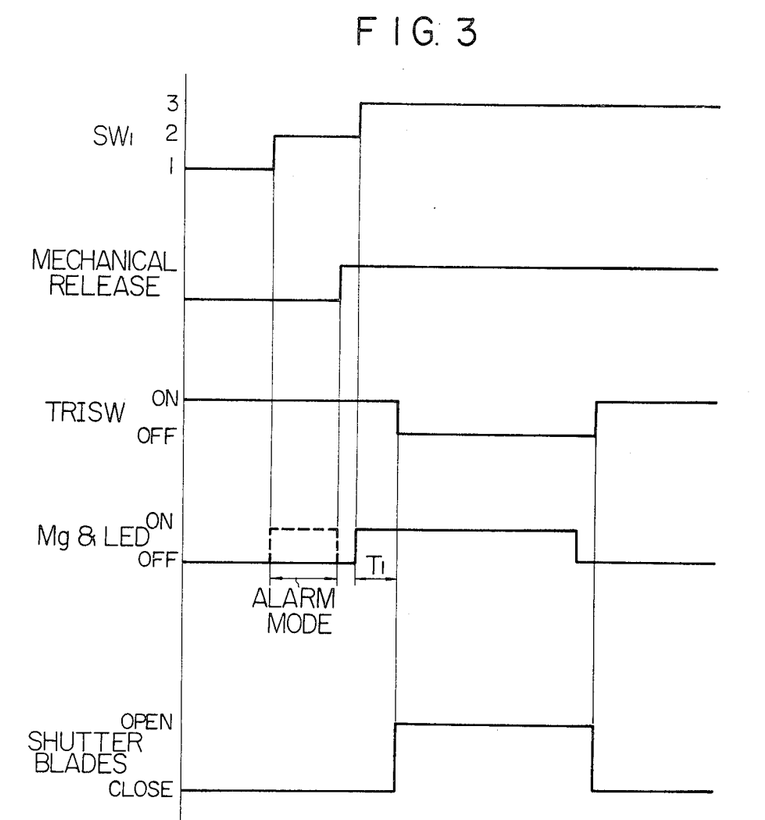
FIG. 3 is a timing diagram of another circuit of the conventional camera.

In order to obviate such wrong display only, the following mechanism could be proposed, namely that the switch SW1 not be switched to the timer mode until after the mechanical release of the shutter. In this case, it is necessary that the magnet Mg be mechanically held before the trigger switch TRISW is opened, that is, before the integration is started. A period of about 10 msec will be necessary for the mechanical holding. Referring to FIG. 3, there is shown a time chart of this operation. As can be seen from FIG. 3, if there is sufficient light to prevent current from flowing through the magnet Mg and the light emitting diode LED during the "alarm mode" and if the above-mentioned period of time T1 in which the magnet Mg is mechanically held is less than 10 msec, there is an interval during which the magnet Mg is not being held, with the result that the magnet Mg works improperly. This could be prevented by providing a mechanical governor to be actuated until the trigger switch TRISW is turned on so that the period of time T1 is increased to more than 10 msec. However, the mechanism would become too complex.

Furthermore, some cameras are provided with synchronizing terminals to which or strobotron is connected. An X-contact is connected to the synchronizing terminals and, simultaneously with the mechanical release, the strobotron is lighted by closure of the X-contact. However, in such a system, the strobotron is lighted when the synchronizing terminal is connected to the strobotron even if there is enough light on the subject.

Figure 4:
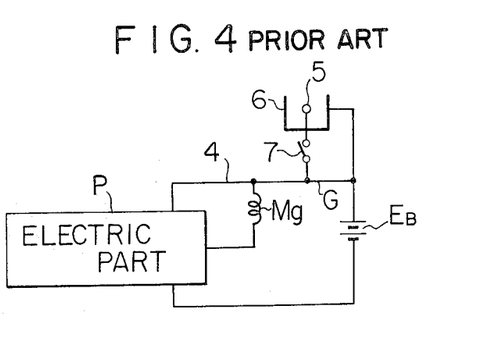
FIG. 4 is a wiring diagram of a circuit of a conventional camera.
Figure 5:
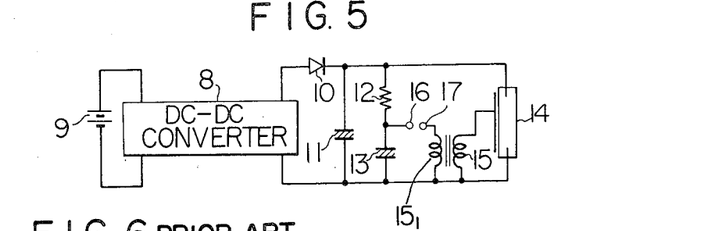
FIG. 5 is a wiring diagram of a strobotron.

Furthermore, in an electro-shutter type camera having an X-contact, when part of the wiring of the X-contact is employed instead of the wiring of the electro-shutter, a power source line is employed. As shown in FIG. 4, an electric part, or circuit, P for the electro-shutter is connected to a battery $E_B$, and a magnet Mg for the electro-shutter is connected between a power source positive line 4 and an output terminal of the electric part P. The X-contract 7 is connected between synchronizing terminals 5 and 6 by using part of the positive line 4. A strobotron circuit is shown in FIG. 5 in which the input side of a DC-DC converter 8 is connected to a battery 9, and a diode 10 and a main condenser 11 are connected in series between the output terminals of the DC-DC converter 8. A flash discharge tube 14 and the series circuit comprising a resistor 12 and a trigger condenser 13 are connected in parallel with a main condenser 11. A secondary circuit of a trigger transformer 15 is connected between one terminal of the flash discharge tube 14 and a trigger electrode. Furthermore, Terminals 16 and 17 are provided for connection to the synchronizing terminals 5 and 6, so that the primary circuit for the trigger transformer 15 can be connected in parallel with the trigger condenser 13 through the X-contact 7. Usually, the output of the battery 9 is converted to a high potential by the DC-DC converter 8 and charges the main condenser 11 through the diode 10 and, at the same time, charges the trigger condenser 13 through a resistor 12. When the terminals 16 and 17 are connected to the synchronizing terminals 5 and 6, the X-contact 7 is closed in synchronism with the shutter, whereby the trigger condenser 13 is discharged and the flash discharge tube 14 is triggered so as to be lighted by the discharging of the main condenser 11.

Figure 28:
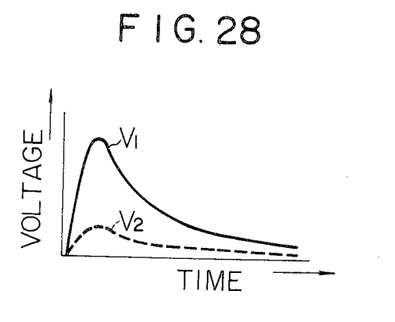
FIGS. 28 to 31 are a graph and circuit diagrams for explaining the embodiment of FIG. 27 and the conventional circuit.
Figure 29:
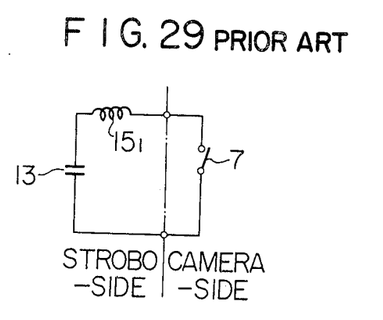
Figure 30:
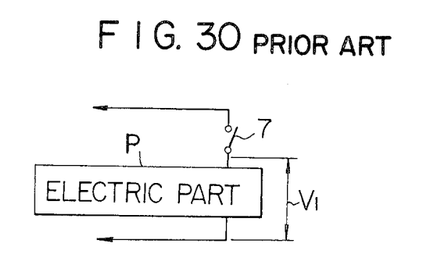

However, when the wiring of the X-contact is so arranged, normally the voltage across in the trigger condenser 13 is applied only to a primary side $15_1$ of the trigger transformer 15 when the X-contact 7 is closed as shown in FIG. 29. On the other hand, when the X-contact 7 is closed with part G disconnected, instead of being connected, as shown in FIG. 4, the voltage across the trigger condenser 13 is applied to the electric part P through the battery $E_B$ on the side of the camera as shown in FIG. 30. Furthermore, the inner resistance of the battery $E_B$ is so small that most of the voltage across the trigger condenser 13 is applied to the electric part P. Therefore, the electric part P is likely to be destroyed by application of a high voltage V1 which is beyond its breakdown voltage as shown by the solid line in FIG. 28. This is apt to occur particularly when it is necessary to separate the electric part P from the magnet Mg and the X-contact 7 and others. In other words, when the electric part P and the magnet Mg and the X-contact 7 are incorporated in one unit by connecting them by a connector, or when the magnet, the X-contact and the electric circuit are connected by contacts as in a mirror-tube-retractable type camera, the fact that the power source positive line section G is connected to the contacts means that improper contact is apt to occur.

SUMMARY OF THE INVENTION

A primary object of the present invention is to provide an electric circuit for a camera for preventing wrong display of a camera vibration alarm means and improper closing of a shutter.

Another object of the invention is to provide an electric circuit for a camera in which improper display of the camera vibration alarm means and improper closing of a shutter are prevented by use of a switching element having a holding function.

A further object of the invention is to provide an electric circuit for a camera in which a resistor is connected in series with a light receiving element for exposure photometry and in which the camera vibration alarm means is controlled by a transistor, with use of signals from the resistor in order to prevent wrong display of the camera vibration alarm means and improper closing of a shutter.

A further object of the invention is to provide an electric circuit for a camera that has synchronizing terminals but is arranged to actuate a flash source only in the dark and not when there is sufficient light on the scene.

A still further object of the invention is to provide an X-contact circuit for use in a camera, and to arrange the circuit so that it is capable of preventing damage to electric parts in the camera as a result of improper disconnection of the wiring in the camera.

DETAILED DESCRIPTION OF THE PREFERRED EMBODIMENTS

Figure 6:
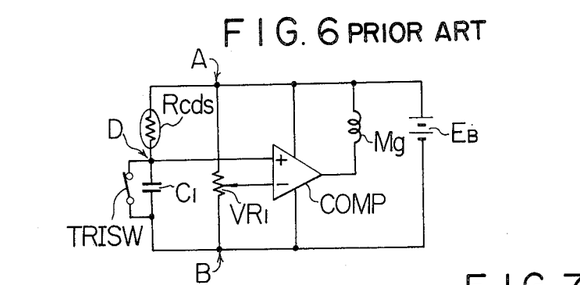
FIG. 6 is a circuit diagram of a timer of an ordinary camera.

In the ordinary timer circuit of a camera, as shown in FIG. 6, a light receiving element Rcds for exposure photometry, which detects the light intensity from a subject, and an integration condenser C1 are connected in series between point A and point B, and a trigger switch TRISW is connected in parallel with the integration condenser C1. Furthermore, a variable resistor VR1 is connected between the point A and the point B, and a sliding terminal of the variable resistor VR1 is connected to a reversing input terminal of a comparator COMP. To a non-reversing input terminal of the comparator COMP, there are connected the light receiving element Rcds and a terminal D of the condenser C1. Power source terminals of the comparator COMP are connected to the points A and B. Furthermore, a magnet Mg for controlling a shutter is connected between an output terminal of the comparator COMP and the point A, and the opposite terminals of a DC power source $E_B$ are connected to the points A and B.

When the trigger switch TRISW is closed, the output of the comparator COMP is at a low level and the magnet Mg is energized. Upon mechanical release of the shutter, the shutter blades open and, at the same time, the trigger switch opens, so that integration of a power source voltage $E_B$ is started in the integrating circuit consisting of the light receiving element Rcds and the condenser C1. When the integrated voltage become equal to a reference voltage Vref set by the variable resistor VR1, the output of the comparator COMP is reversed to a high level and the magnet Mg is de-energized, whereupon mechanical stopping means are released. This causes the shutter blades to close, which terminates the desired exposure time. The interval T from the time the trigger switch TRISW is opened, or is transferred to its "off" state, until the time the magnet Mg is de-energized is determined by the equation $$T = -C_1 R_{cds} \ln\left(1 - \frac{V_{ref}}{E_B}\right) \quad (1)$$

and, since the reference voltage Vref is a fraction of the power source voltage $E_B$ and is set by the variable resistor VR1, the reference voltage is given as follows:

$$V_{ref} = \alpha E_B \quad (2)$$

where $\alpha$ is the divided voltage ratio. Therefore, Equation (1) can be rewirtten as follows:

$$T = -C_1 R_{cds} \ln(1-\alpha) \quad (3)$$

This indicates that the internal T does not depend on the magnitude of the power source voltage $E_B$ as long as the power source voltage is not varied during integration. In this case, since the light receiving element Rcds, the condenser C1 and the variable resistor VR1 constitute a bridge circuit, an interval T can be obtained that is independent of the variation of the power source voltage.

Figure 7:
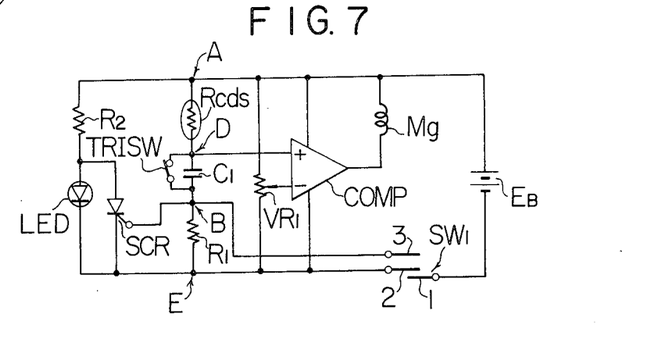
FIG. 7 is a circuit diagram of one embodiment of an electric circuit of a camera according to the invention.

In a first embodiment of the present invention, which is shown in FIG. 7, in the above-mentioned timer circuit, point B is connected to point E through resistor R1, and a variable resistor VR1 is connected between points A and E and, at the same time, the power source terminals of comparator COMP are also connected to the points A and E. Furthermore, between the points A and E, there is connected an alarm light emitting diode LED connected in series with a resistor R2 and in parallel with the source-drain circuit of a thyristor SCR. The gate of the thyristor SCR is connected to the point B. A contact 1 of a switch SW1 is connected to a negative terminal of a DC power source $E_B$, and contacts 2 and 3 are respectively connected to the point E and the point B.

Figure 8:
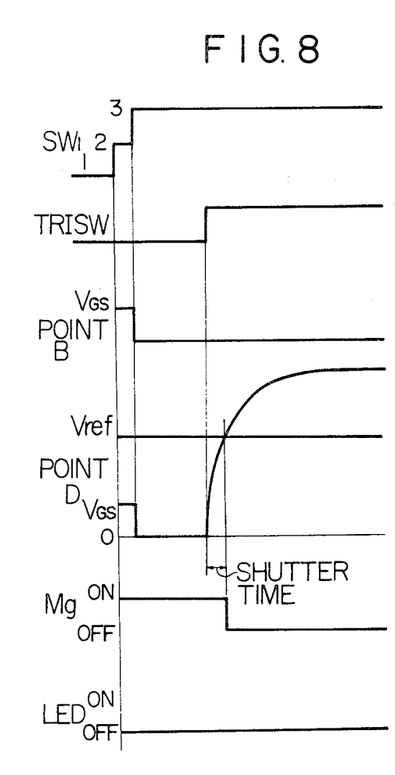
FIGS. 8 and 9 are timing diagrams of the embodiment of FIG. 7.
Figure 9:
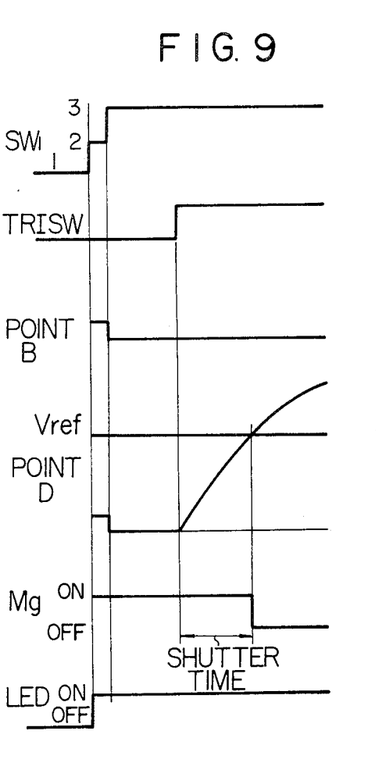

In the thus constructed electric circuit, when the contacts 1 and 2 of the switch SW1 are connected together by pressing lightly on the release button, the DC power source $E_B$ is connected between the points A and E. When a trigger switch TRISW is closed, a voltage VGS (see FIG. 8) produced by the voltage divider consisting of the light receiving element Rcds and a resistor R1 is applied between the gate and source of the thyristor SCR. Therefore, when the subject is sufficiently illuminated, the light emitting diode LED is short-circuited and extinguished by the thyristor SCR, which is conductive. However, when the ambient light is low the light emitting diode is lighted, because the thyristor SCR is non-conductive, so that the vibrations of camera are alarmed. This is an alarm mode and this state is held by the thyristor SCR irrespective of the stroke of the release button. When the contacts 1, 2 and 3 of the switch SW1 are connected by heavier pressure on the release button, the resistor R1 is short-circuited by the switch SW1, and the light receiving element Rcds and the condenser C1 form a timer circuit in a timer mode. The operation of such a timer circuit has been described in connection with FIG. 1. The operation of the timer circuit when there is sufficient light is shown in FIG. 8, while its operation when there is not sufficient light is shown in FIG. 9.

In this sort of electric circuit of a camera, since operation of the light emitting diode is controlled by the thyristor SCR, such an adjustment as in the conventional electric circuit becomes unnecessary and turning on the light emitting diode under the wrong conditions, as well as improper operation of a shutter are obviated. There are two types of trigger switches TRISW. One type closes only during shutter setting and the other type closes except during shutter operation. The display of light emitting diode LED in the embodiments of this invention will be correct when any type of the trigger switch is employed.

Figure 10:
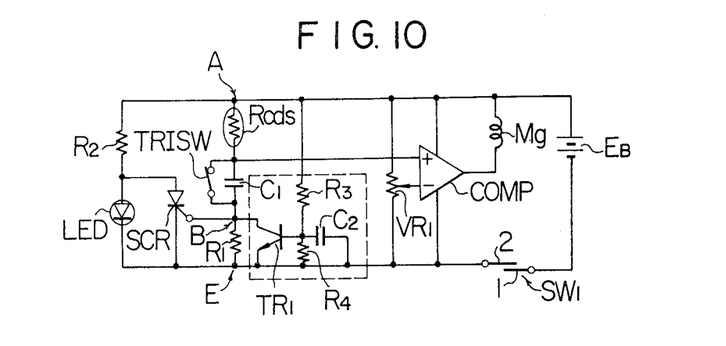
FIGS. 10 to 15 are circuit diagrams of other embodiments of the invention.

Referring to FIG. 10, there is shown a second embodiment of an electric circuit for a camera according to the invention. In this embodiment, the function of short-circuiting of the resistor R1 by the contacts 2 and 3 of the switch SW1 in the first embodiment is electrically performed by a transistor TR1 and an integration circuit within a closed broken line in FIG. 10. The switch SW1 has only two contacts 1 and 2. The collector-emitter circuit of the transistor TR1 is connected across the resistor R1, and the base of the transistor TR1 is connected to the common connection of a fixed divider consisting of the resistors R3 and R4. The resistors R3 and R4 are connected in series between the points A and E, and a condenser C2 is connected in parallel with a resistor R4. When the switch SW1 is turned on, power source voltage is integrated by the condenser C2 and the resistors R3 and R4 and, until the voltage across the condenser C2 builds up enough, the transistor TR1 is non-conductive and an alarm mode is set, so that the above-mentioned operation is performed. When the output of the integration circuit across the condenser C2 reaches a predetermined voltage, the transistor TR1 becomes conductive and short-circuits the resistor R1 in accordance with the operations of this timer circuit. In this embodiment, since the switch SW1 has only two contacts, the control of the stroke is made easier in comparison with the first embodiment.

Figure 11:
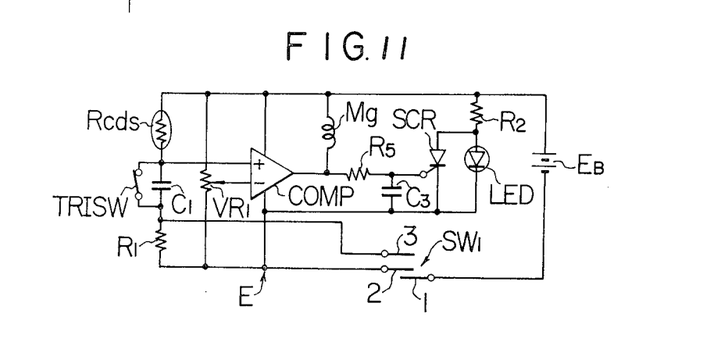

Referring to FIG. 11, there is shown a third embodiment of the invention. In this embodiment, the gate of the thyristor SCR is connected to the output terminal of the comparator COMP through a resistor R5 and the condenser C3 is connected between the gate of the thyristor and the point E. Therefore, at the time of the alarm mode, a voltage divided by the light receiving element Rcds and the resistor R1 is compared with a reference voltage Vref set by the variable resistor VR1 in the comparator COMP, and the output of the comparator COMP is applied between the gate and the source of the thyristor SCR. Under conditions of insufficient light, the light emitting diode LED is lighted with the thyristor off. On the other hand, when there is sufficient light, the light emitting diode LED is extinguished with the thyristor SCR on. The condenser C3 prevents the thyristor SCR from being made conductive erroneously due to the operation lag of the comparator COMP when there is insufficient light. In the first embodiment of the invention, the vibrations of the camera are judged by use of the voltage between the gate and the source of the thyristor SCR. The judgement greatly depends upon the voltage. However, in the third embodiment, since the vibrations of the camera is judged by use of the comparator COMP, the voltage dependence of the judgement is small.

Figure 12:
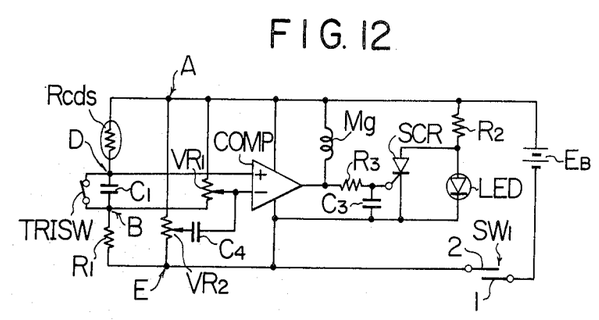

Referring to FIG. 12, there is shown a fourth embodiment of the invention. In this embodiment, the point B is connected to the point E through the resistor R1 and the power source terminals of the comparator COMP are connected to the points A and E. Furthermore, the switch SW1 has only two contacts 1 and 2, and the contact 1 is connected to the negative terminal of the DC power source $E_B$ while the contact 2 is connected to the point E. The end terminals of the variable resistor VR2 are connected to the points A and E, and the sliding terminal of the variable resistor VR2 is connected to the reverse input terminal of the comparator COMP through the condenser C4. The camera vibration alarm light emitting diode LED is connected in series with the resistor R2 between the points A and E, and the thyristor SCR is connected in parallel with the light emitting diode LED. The gate of the thyristor SCR is connected to the output terminals of comparator COMP through the resistor R3, and the condenser C3 is connected between the gate of the thyristor SCR and the point E.

When the contacts 1 and 2 of the switch SW1 in FIG. 12 are connected by pressing lightly on the release button, the DC power source $E_B$ is connected between the points A and E and, with the trigger switch TRISW closed, a voltage divided by the light receiving element Rcds and the resistor R1 is applied to the comparator COMP. The reference voltage set by the variable resistor VR2 is transiently applied to the comparator COMP through the condenser C4, and the reference voltage and the divided voltage are compared with each other by the comparator COMP. The output of the comparator COMP is applied between the gate and the source of the thyristor SCR, so that, when there is sufficient light on the subject the light emitting diode LED is extinguished by the conductive thyristor. When the subject is not sufficiently well lighted, the light emitting diode LED is lighted, because the thyristor SCR is non-conductive, so that the camera vibration alarm is performed, which is the alarm mode. This state is held by the thyristor SCR irrespective of the stroke of the release button. In this circuit, the condenser C3 serves to prevent the thyristor SCR from being erroneously made conductive when there is not enough light. Such improper operation of the thyristor SCR may be caused by an operation lag of the comparator COMP. The timer section of the circuit in FIG. 12 operates as mentioned previously.

Figure 13:
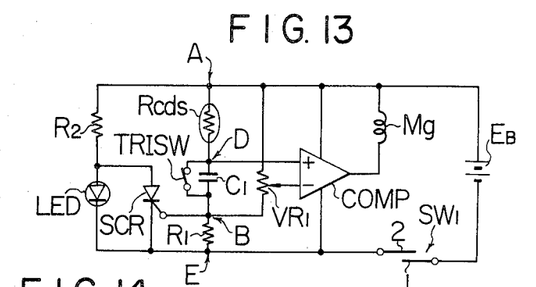

Referring to FIG. 13, there is shown a fifth embodiment of the invention. In this embodiment, the variable resistor VR2, the condensers C4 and C3, and the resistor R3 of the circuit in FIG. 12 are omitted and the gate of the thyristor SCR is connected to the point B. Therefore, in the alarm mode, a divided voltage of the light receiving element Rcds and the resistor R1 is directly applied between the gate and the source of the thyristor SCR, so that the thyristor SCR and the light emitting diode are operated as described previously. In the timer mode, the point B is locked at the potential of about 0.65 V, which is the voltage between the gate and the source of the thyristor SCR, so that the shutter timing is accurately maintained.

Instead of the above-mentioned thyristor, switching elements having a holding function, such as a programmable uni-junction transistor can be employed.

Figure 14:
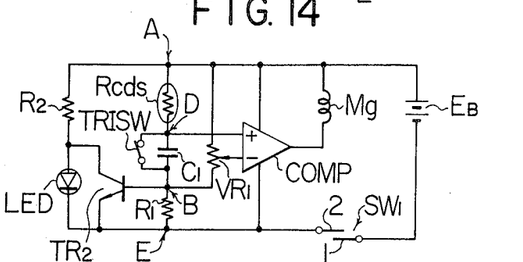

In FIG. 14, there is shown a sixth embodiment of the invention in which the point B in the timer circuit is connected through the resistor R1 to the point E. The switch SW1, which has only two contacts 1 and 2, is connected, between the point E and DC power source $E_B$. The light emitting element LED is connected in series with the resistor R2 between the points A and E, and the emitter-collector circuit of a transistor TR2 is connected in parallel with the light emitting diode LED, while the base of the transistor TR2 is connected to the point B.

In the circuit of FIG. 14, when the contacts 1 and 2 of the switch SW1 are connected with each other by light pressure on the release button, the DC power source $E_B$ is connected between the points A and E. With the trigger switch TRISW closed, the power source voltage is divided by the light receiving element Rcds and the resistor R1, and the voltage across the resistor R1 is applied between the base and the emitter of the transistor Tr2. Therefore, when the subject is sufficiently illuminated, the light emitting diode LED is extinguished by being effectively short-circuited by the conductive transistor TR2. In the absence of sufficient illumination to make the transistor conductive, the light emitting diode LED is lighted to indicate that fact. This is the alarm mode. The timer circuit is operated in the same manner as mentioned previously.

In the electric circuit in FIG. 14, a resistor is connected in series with a photometric bridge in the timer circuit and the signals produced across the resistor control the transistor TR2, which, in turn, controls the light emitting diode LED. At the same time, the switch SW1 having two contacts 1 and 2 is employed. Therefore, the previously mentioned adjustment in the conventional electric circuit becomes unnecessary, so that incorrect illumination of the light emitting diode and improper operation of the shutter are obviated. Furthermore, when a trigger switch TRISW is employed, which is closed except during shutter operation, the light emitting diode LED effects correct display after shutter operation is finished. It is conceivable to use a thyristor instead of the the transistor TR2. If that is done, the thyristor may be erroneously turned on by noise and other factors, so that the light emitting diode LED will be extinguished and the holding will be effected. However, in this embodiment, since the transistor TR2 is employed, holding of the wrong display is not performed.

Figure 15:
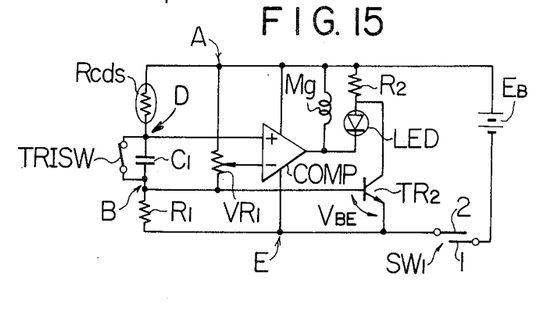
Figure 16:
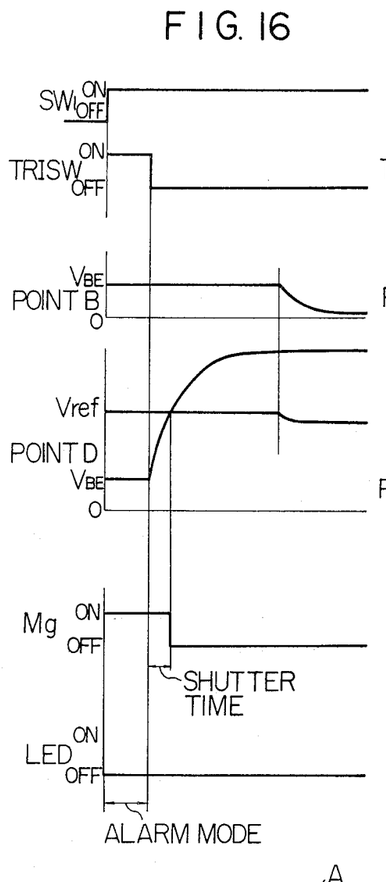
FIGS. 16 and 17 are timing diagrams of the embodiment of FIG. 15.
Figure 17:
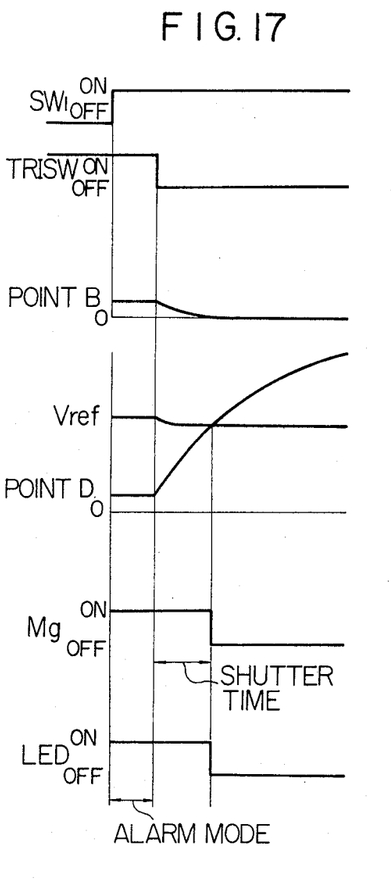

In FIG. 15, there is shown a seventh embodiment of the invention. In this embodiment, the light emitting diode LED is connected in series with the resistor R2 between the point A and the output terminal of the comparator COMP, and the collector of the transistor TR2 is connected to the common circuit point between the light emitting diode LED and the resistor R2. Therefore, when the switch SW1 is closed, the output of the comparator COMP is set at a low level, so that, if there is sufficient light, the transistor TR2 will be conductive and the light emitting diode LED will be extinguished. If there is not sufficient light, the transistor TR2 will be non-conductive and the light emitting diode LED will be lighted. The operation of this embodiment is shown in FIGS. 16 and 17. FIG. 16 shows the operation in the light while FIG. 17 shows the operation in the dark. In this embodiment, even if the trigger switch TRISW is of a type which closes only at the time the shutter is set, the light emitting diode is not lighted after shutter operation.

Figure 18:
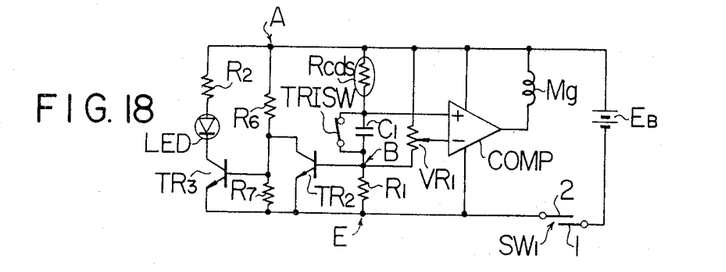
FIGS. 18 and 19 are circuit diagrams of further embodiments of the invention.

Referring to FIG. 18, there is shown an eighth embodiment of the invention. In this embodiment, an electric circuit comprising a transistor TR3, a resistor R6 and a resistor R7 is added to the the circuit that constitutes the sixth embodiment shown in FIG. 14. The transistor TR3 is inserted between the light emitting diode LED and the point E. The resistors R6 and R7 are connected in series between the points A and E, and the collector of the transistor TR2 and the base of the transistor TR3 are connected to the common connection point of the resistors R6 and R7. Therefore, when the light is sufficient light, the transistor TR2 is conductive and the transistor TR3 is non-conductive, so that the light emitting diode LED is extinguished. However, if there is not enough light, the transistor TR2 is non-conductive and the transistor TR3 is conductive, so that the light emitting diode LED is lighted and the camera vibration alarm is performed. A battery is employed as the DC power source $E_B$. When the camera is aimed at a dark scene, the light emitting diode LED is lighted if the of the battery $E_B$ is sufficient but, if the capacity battery $E_B$ is weak, the light emitting diode will not be lighted. This serves as a test by which the battery $E_B$ can be checked.

In the embodiment in FIG. 18, when the power source $E_B$ has a sufficiently high voltage, one terminal of the variable resistor VR1 can be connected to the point E, rather than to the point B.

Figure 19:
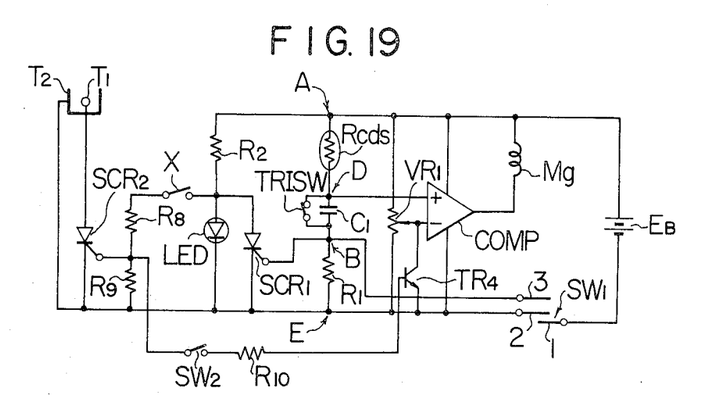

In FIG. 19, there is shown a ninth embodiment of the invention. In the timer circuit of this embodiment, the point B is connected through the resistor R1 to the point E, and the variable resistor VR1 is connected directly between the points A and E, as are the power source terminals of the comparator COMP. Furthermore, the camera vibration alarm light emitting diode LED is connected in series with the resistor R2 between the points A and E, and a thyristor SCR1 is connected in parallel with the light emitting diode LED. The gate of the thyristor SCR1 is connected to the point B. The contact 1 of the switch SW1 is connected to a negative terminal of the DC power source $E_B$, and the contacts 2 and 3 of the switch SW1 are respectively connected to the points E and B. A series circuit consisting of a resistor R8 and a resistor R9 and the synchronizing contact X is connected in parallel with the light emitting diode LED. The common connection point of the resistors R8 and R9 is connected to the gate of a thyristor SCR2 and is also connected through a switch SW2 and a resistor R10 to the base of a transistor TR4. The collector and the emitter of the transistor TR4 are respectively connected to the reverse input terminal of the comparator COMP and the point E. The anode of the thyristor SCR2 is connected to one synchronizing terminal T1, and the cathode of the thyristor SCR2 and the other synchronizing terminal T2 are connected to the point E.

Figure 20:
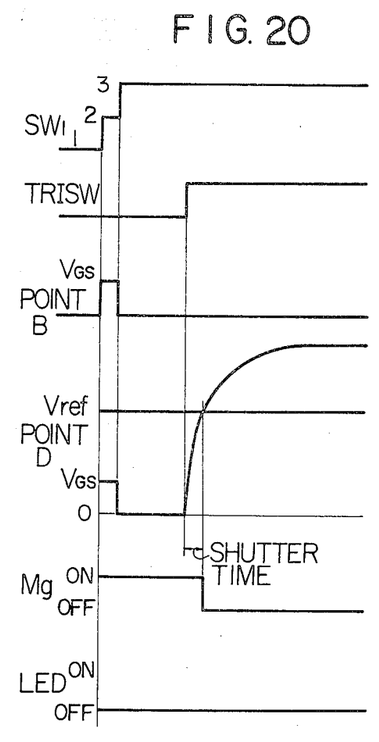
FIGS. 20 to 22 are the timing diagrams of the embodiment of FIG. 19.
Figure 21:
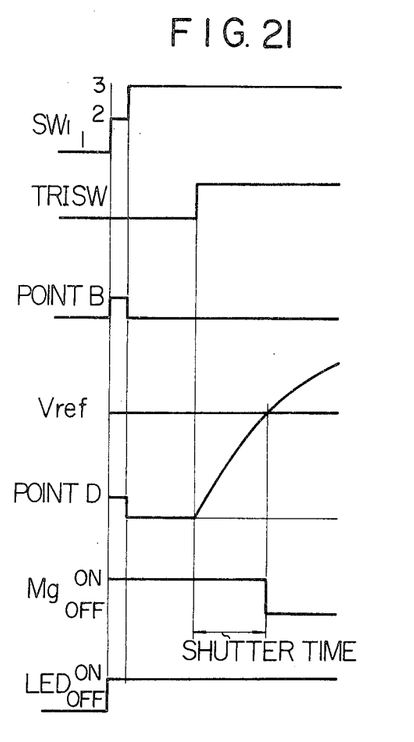
Figure 22:
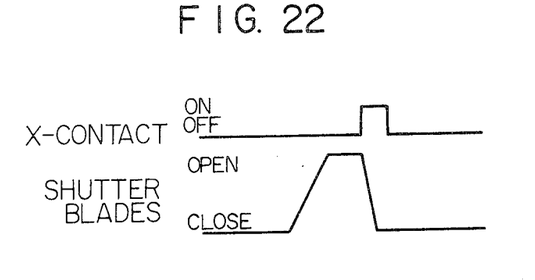

In the thus constructed electric circuit, when the contacts 1 and 2 of the switch SW1 are connected, by lightly pressing on the release button, the DC power source $E_B$ is connected between the points A and F. With the trigger switch TRISW closed, a power source voltage VGS obtained by operation of the voltage divider comprising the light receiving element Rods and the resistor R1 is applied between the gate and the source of the thyristor SCR1. Therefore, there is sufficient light on the subject, the light emitting diode LED is short-circuited and extinguished, because the thyristor SCR1 is conductive. However, if the light is inadequate, the light emitting diode LED is lighted because the thyristor SCR1 is non-conductive, so that the camera vibration alarm is performed. This is the alarm mode, and this state is held by the thyristor SCR1 irrespective of the stroke of the release button. When the contacts 1, 2 and 3 of the switch SW1 are connected, as a result of greater pressure on R1 is short-circuited by the switch SW1 and a timer circuit is formed, which places the circuit in its timer mode. At this time, the timer circuit is operated as mentioned previously, as shown in FIGS. 20 and 21. FIG. 20 shows the operation in the light, and FIG. 21 shows the operation in the the case of inadequate light. If a strobotron is connected to the synchronizing terminals T1 and T2, making the thyristor SCR2 conductive when the X-contact is closed at a time when there is not enough light to take a photograph causes the strobotron to flash. At this time, when the switch SW2 has been closed in advance, closing the X-contact causes the transistor TR4 to become conductive and the reference voltage Vref to be reduced, so that the magnet Mg is de-energized. As a result, the shutter blades are closed at the time shown in FIG. 22. However, when there is sufficient light, even if the X-contact is closed, the thyristor SCR2 and the transistor TR4 will not become conductive on and accordingly the strobotron.

In the electric circuit in FIG. 19, since actuation of the light emitting diode LED is prevented by the thyristor SCR1, the previously mentioned adjustment in the conventional electric circuit becomes unnecessary and improper operation of the light emitting diode and the of the shutter are obviated. Furthermore, whether the switch TRISW is of the type that is closed only at the time the shutter is set or is of the type that is closed except during shutter operation. , the light emitting diode LED operates correctly.

Figure 23:
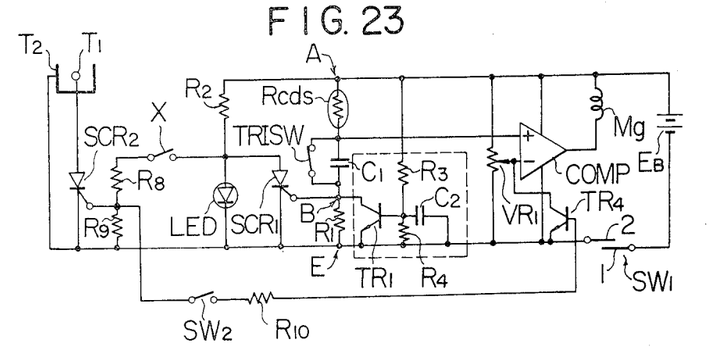
FIGS. 23 to 27 are circuit diagrams of further embodiments of the invention.

Referring to FIG. 23, there is shown a tenth embodiment of the invention. In this embodiment, the function of short-circuiting of the resistor R1, which is performed by the contacts 2 and 3 of the switch SW1 in the ninth embodiment is electrically performed by the transistor TR1 and the integration circuit within the broken line. The switch SW1 has two contacts 1 and 2. The collector and the emitter of the transistor TR1 are connected to the two terminals of the resistor R1, and the base of the transistor TR1 is connected to the common connection point of the two resistors R3 and R4. The resistors R3 and R4 are connected in series between the points A and E, and the condenser C2 is connected in parallel with the resistor R4. With the switch SW1 closed, the power source voltage is integrated by the condenser C2 and the resistors R3 and R4 and, due to the low initial voltage across the resistor R4, the transistor TR1 is non-conductive, so that the camera vibration alarm mode is set, and the previously mentioned operation is performed. When the output of the integration circuit across the resistor R4 reaches a voltage above a predetermined level, the transistor TR1 becomes conductive and short-circuits the resistor R1 so that an exposure timer circuit is formed. In this embodiment, since the switch SW1 has two contacts, the control of the stroke is easy.

Figure 24:
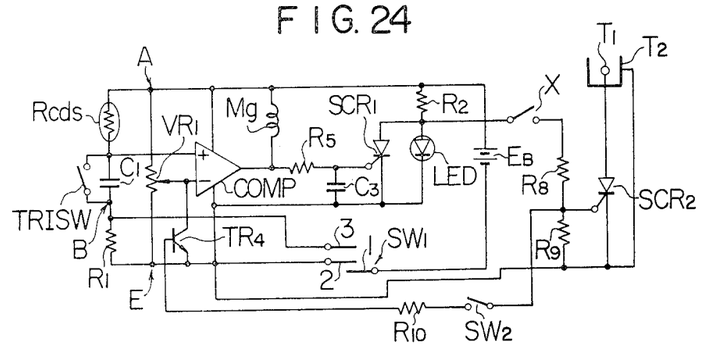

Referring to FIG. 24, there is shown an eleventh embodiment a resistor of the invention. In this embodiment, R5 is connected in series between the gate of the thyristor SCR1 and the output terminal of the comparator COMP, and the condenser C3 is connected between the gate of the thyristor SCR1 and the point E. Therefore, when the circuit is in its alarm mode, a voltage divided by the light receiving element Rcds and the resistor R1 is compared by the comparator COMP with the reference voltage Vref set by the variable resistor VR1, and the output of the comparator COMP is applied between the gate and the source of the thyristor SCR1. Since the light emitting diode LED is connected in parallel with the source-anode circuit of the thyristor SCR1, the light emitting diode is lighted when the scene is dark, because the thyristor SCR1 will be non-conductive while, in the light, the light emitting diode LED is extinguished, because then the thyristor SCR1 will be conductive. The condenser C3 serves to prevent the thyristor SCR1 from being erroneously made conductive due to the operation lag of the comparator COMP when the scene is dark. In the circuit in FIG. 19, since the camera vibration is judged by use of the voltage between the gate and the source of the thyristor SCR1, the judgment greatly depends upon the voltage. However, in this embodiment, since the camera vibration is judged by use of the comparator COMP, the voltage dependence of the judgment is small.

Figure 25:
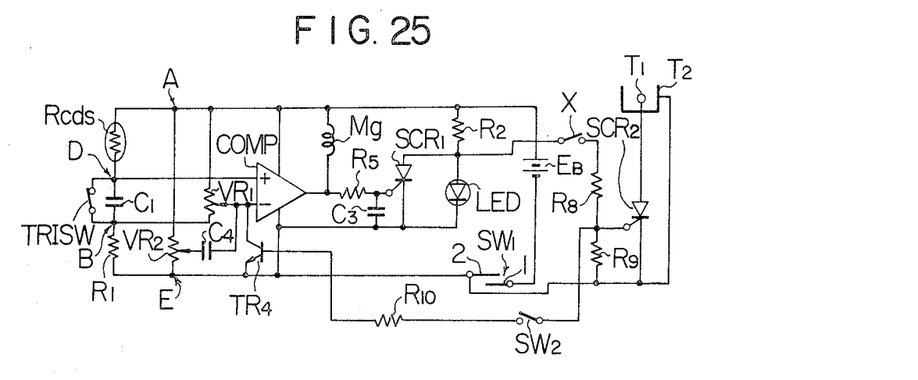

In FIG. 25, there is shown a twelfth embodiment of the invention. In this embodiment, the variable resistor VR1 is connected between the points A and B of the eleventh embodiment in FIG. 24, so that a bridge circuit is formed by the variable resistor VR1, the light receiving element Rcds and the condenser C1. The switch SW1 has two contacts 1 and 2, and the contact 1 is connected to a negative terminal of the DC power source $E_B$ and the contact 2 is connected to the point E. The end terminals of the variable resistor VR2 are connected to the points A and E, and the sliding terminal of the variable resistor VR2 is connected by means of the condenser C4 to the reverse input terminal of the comparator COMP.

In the thus constructed electric circuit, when the contacts 1 and 2 of the switch SW1 are connected, by pressing lightly on the release button, the DC power source $E_B$ is connected between the points A and E. If, at that time, the trigger switch TRISW is closed, a voltage divided by the light receiving element Rcds and the resistor R1 will be applied to the comparator COMP. In addition, when the switch SW1 is closed, the reference voltage set by the variable resistor VR2 is transiently applied to the comparator COMP through the condenser C4, and the reference voltage and the above-mentioned divided voltage are compared in the comparator COMP. The output of the comparator COMP is applied between the gate and source of the thyristor SCR1 whereby, when the subject has sufficient light, the light emitting diode LED is extinguished by the conductive thyristor SCR1 while, if the subject does not have enough light, the light emitting diode LED is energized because the thyristor SCR1 non-conductive, so that the camera vibration alarm is performed. This is the alarm mode. This state is held by the thyristor SCR1 irrespective of the stroke of the release button.

Figure 26:
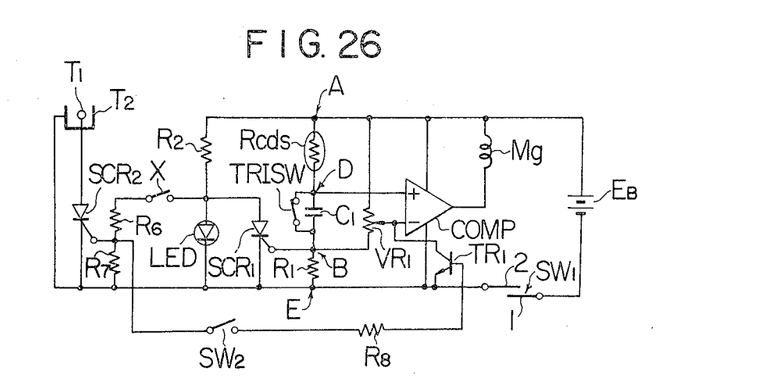

Referring to FIG. 26, there is shown a thirteenth embodiment of the invention. In this embodiment, the variable resistor VR2, the condensers C3 and C4 and the resistor R5 shown in FIG. 5 are omitted, and the gate of the thyristor SCR1 is connected to the point B. Therefore, in the alarm mode, a voltage divided by the light receiving element Rcds and the resistor R1 is applied between the gate and source of the thyristor SCR1, and the thyristor SCR1 is operated as mentioned previously. Furthermore, in the timer mode, the potential of the point B is locked at about 0.65 volts, which is the voltage between the gate and the source of the thyristor SCR1, so that the shutter time is maintained accurately.

Figure 27:
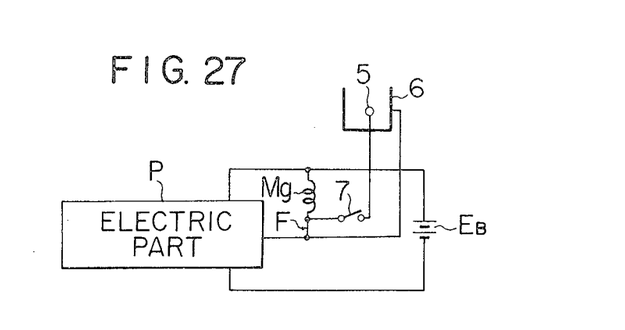
Figure 31:
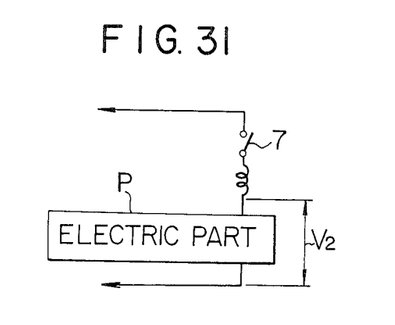

In a fourteenth embodiment of the invention, part of the wiring for the X-contact 7 is replaced by a part F of a magnet-driving signal wire for an electro-shutter, as shown in FIG. 27 in the electric circuit of an electro-shutter type camera having the X-contact. When the X-contact 7 is closed with the part F of the magnet-driving signal wire disconnected, the voltage charged in a trigger condenser 13 (FIG. 5) is applied to the output terminal of the electric part P through the magnet Mg and to the positive power supply line, as shown in FIG. 31. When that happens the inductance of the magnet Mg is equivalent to a high resistance in the transient state. Moreover, the X-contact 7 closes only a short time. Therefore, a reduced voltage V2 is applied to the electric part P from the output terminal and the power source positive line, as shown by the dotted line in FIG. 28, so that the electric part 1 is not damaged.

Figure 32:
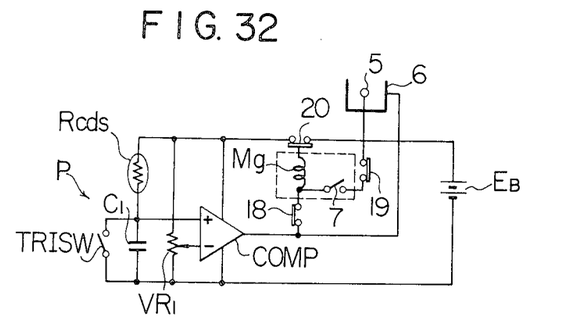
FIG. 32 is a circuit diagram of a still further embodiment of the invention.

In FIG. 32, there is schematically shown a further embodiment of the invention, in which the magnet Mg and the X-contact 7 are separated from the electric part P. In this embodiment, the electric part P and the terminal 5 are connected to the magnet Mg and the X-contact 7 by a connecting device 18. The X-contact 7 and a terminal 5 are connected together by a contact of a connecting device 19, and the magnet Mg, the electric part P and a battery $E_B$ are together by the contact of a connecting device 20. The electric part P is an electro-shutter, for example, such as the electric circuit described in the above-mentioned embodiment. Briefly, in FIG. 32, the electric part P includes, a light receiving element Rcds for exposure photometry and a condenser C1 connected in series between the positive and negative terminals of a battery $E_B$. A trigger switch TRISW is connected in parallel with the condenser C1, and the connecting point of the light receiving element Rcds and the condenser C1 is connected to a non-reverse terminal of the comparator COMP. The power source terminals of the comparator COMP are connected to the two terminals of the battery $E_B$, and the reverse input terminal is connected to a sliding terminal of a variable resistor VR1. The ends of the variable resistor VR1 are connected to the two terminals of the battery $E_B$. When the release button is depressed, the trigger switch TRISW is opened together with the mechanical release, and the integration is initiated by the light receiving element Rcds and the condenser C1. The integrated output is compared with the reference voltage set by the variable resistor VR1 by the comparator COMP. When the output of the comparator COMP changes to a high level, the magnet Mg is de-energized so that the shutter is closed. In the X-contact circuit, since part of the wiring of the X-contact is replaced by the magnet-driving signal wire for the electro-shutter, damage to the electric part can be prevented.

What is claimed is:

1. An electric circuit for use with a camera having a shutter, said circuit comprising:
    an electromagnet for controlling said shutter;
    an integrating circuit comprising light responsive means, a condenser, and a resistor;

trigger switch means connected to said condenser to short-circuit the condenser under selective conditions and to allow a voltage to build up in said condenser during exposures;

actuating means connected to said integrating circuit to be controlled thereby, said actuating means being connected to said electromagnet to actuate said electromagnet when voltage across said condenser reaches a predetermined value;

a switching element operated by a signal from current flowing through said resistor; and alarm means connected to said switching element to be controlled thereby;

said light responsive means being photoconductive and said light responsive means, said condenser, and said resistor being connected in series to form said integrating circuit;

said alarm means having two terminals and said switching element comprising a transistor having base and emitter electrodes forming a base-emitter input circuit, and a collector electrode forming, with said emitter electrode, an emitter-collector output circuit, said input circuit being connected across said resistor, and a low impedance path connecting said output circuit to one of said terminals of said alarm means to connect said two terminals of said alarm means together when the intensity of light on said light responsive means is high enough.

2. The electric circuit in claim 1 in which said electric circuit comprises a second resistor connected in series with said alarm means, said input circuit of said transistor being connected in parallel with said first-named resistor, and said output circuit of said transistor being connected between a fixed voltage point and a common circuit point between said alarm means and said second resistor.

3. An electric circuit for use with a camera having a shutter, said circuit comprising:
an electromagnet for controlling said shutter;
an integrating circuit comprising light responsive means, a condenser, and a resistor;
trigger switch means connected to said condenser to short-circuit the condenser under selective conditions and to allow a voltage to build up in said condenser during exposures;
actuating means connected to said integrating circuit to be controlled thereby, said actuating means being connected to said electromagnet to actuate said electromagnet when voltage across said condenser reaches a predetermined value;
a switching element operated by a signal from current flowing through said resistor;
alarm means connected to said switching element to be controlled thereby;
said light responsive means being photoconductive and said light responsive means, said condenser, and said resistor being connected in series to form said integrating circuit;
said actuating means comprising a comparison circuit, and said light responsive means and said resistor comprising a light measuring circuit comprising an instantaneous light responsive signal when said condenser is short-circuited by said trigger switch means and an integrated light measuring circuit when said condenser is not short-circuited, said electric circuit further comprising: means to establish a reference voltage, said comparison circuit being connected to said means for establishing a reference voltage and to said light measuring circuit to compare said reference voltage with a light measuring output voltage of said light measuring circuit to cause current to flow through said electromagnet when said light measuring voltage is less than said reference voltage;
said condenser being connected in series between said resistor and said light responsive means, said electric circuit comprising, in addition, a voltage divider comprising resistance means connected in parallel with the portion of said integrating circuit comprising said light responsive means and said condenser, said voltage dividing means comprising an intermediate terminal connected to a first input terminal of said comparison circuit, said trigger switch means being connected in parallel with said condenser, and a common connection terminal between said condenser and said light responsive means connected to a second input terminal of said actuating means.

4. The electric circuit in claim 3 in which said alarm means comprises a light emission diode and said switching element is a first transistor comprising base and emitter electrodes forming a base-emitter input circuit, and a collector electrode forming, with said emitter electrode, an emitter-collector output circuit connected in series with said light emission diode, said electric circuit comprising, in addition, a second transistor connecting said resistor to said input circuit of said first transistor to invert the voltage across said resistor.

5. The electric circuit as claimed in claim 3 in which said comparison circuit comprises an output terminal connected to said electromagnet and through which the electromagnet is energized when the voltage at said second input terminal is below the voltage at said first input terminal.

6. The electric circuit of claim 3 comprising, in addition:
terminals for synchronizing a flash source;
a thyristor comprising an output circuit connected in series with said terminals;
an X contact connected to a power supply means and connected to an input terminal of said thyristor;
a second thyristor forming said switching elements, connected to said X contact and having an input terminal;
circuit means connecting said light responsive means to said input terminal of said second thyristor to cause said second thyristor to be conductive when there is sufficient light to make it unnecessary to use a flash source, said second thyristor connecting said X contact to a source of potential to prevent said first thyristor from becoming conductive when said second thyristor is conductive.

7. An electric circuit as claimed in claim 3 in which said switching element is an electronic latching element that changes its state of conductivity in response to said signal from current flowing through said resistor and remains in the changed state of conductivity when said current flowing through said resistor is reduced.

8. The electric circuit as claimed in claim 7 in which said switching element is a thyristor comprising gate and cathode electrodes connected across said resistor.

9. The electric circuit as claimed in claim 8 in which said thyristor is a silicon-controlled rectifier.

10. The electric circuit as claimed in claim 9 in which said alarm means comprises a light emitting diode and the anode-cathode circuit of said silicon-controlled rectifier is connected in parallel with said light emitting diode.

11. An electric circuit for use with a camera having a shutter, the circuit comprising:
   an electromagnet for controlling the shutter;
   a comparator having two input comparison terminals, two power terminals and one output terminal;
   an integrating circuit comprising a light responsive element, a condenser, and a resistor connected in series, said integrating circuit connected to each of said power terminals, with one of said comparison terminals connected between said light responsive element and said condenser, and the other of said comparison terminals connected to the variable terminal of a voltage divider;
   said divider connected across and in parallel to said light responsive element and condenser;
   a voltage supply connected in parallel across said series connected light responsive element, condenser and resistor;
   said electromagnet connected between one pole of said voltage supply and said comparator output terminal;
   a trigger switch connected to said condenser to short circuit the condenser under selective conditions and to allow a voltage to build up in said condenser;
   alarm means connected in parallel with said electromagnet between said one pole of said voltage supply and said output terminal of said comparator; and
   a transistor having a base connected to a junction between said condenser and said resistor and an emitter terminal connected to another pole of said voltage supply, said transistor having a collector terminal connected to said first mentioned pole of said voltage supply for preventing current from flowing through said alarm means when said transistor is conductive by voltage applied across said base and emitter terminals.

12. The electric circuit according to claim 11, further including a second resistor connected between said first mentioned pole of said voltage supply and said alarm means.

13. The electric circuit according to claim 12, wherein said alarm means comprises a light emitting diode.

14. The electric circuit according to claim 13, including a switch connected to said voltage supply for connecting and disconnecting said voltage supply from a remainder of the electric circuit.

* * * * *